(12) United States Patent
Kim et al.

(10) Patent No.: US 10,317,596 B2
(45) Date of Patent: Jun. 11, 2019

(54) POLYENE POLARIZER HAVING SPECIFIED DICHROIC RATIO, METHOD FOR MANUFACTURING SAME, AND POLARIZING PLATE AND OPTICAL DISPLAY DEVICE COMPRISING SAME

(71) Applicant: SAMSUNG SDI CO., LTD, Gongse-ro, Giheung-gu, Yongin-si, Gyeonggi-do (KR)

(72) Inventors: Jin Sook Kim, Uiwang-si (KR); Do Won Kim, Uiwang-si (KR); Jong Hoon Kim, Uiwang-si (KR); Jik Soo Shin, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 436 days.

(21) Appl. No.: 14/901,417

(22) PCT Filed: Feb. 27, 2014

(86) PCT No.: PCT/KR2014/001627
§ 371 (c)(1),
(2) Date: Dec. 28, 2015

(87) PCT Pub. No.: WO2014/208861
PCT Pub. Date: Dec. 31, 2014

(65) Prior Publication Data
US 2016/0146994 A1 May 26, 2016

(30) Foreign Application Priority Data

Jun. 27, 2013 (KR) .................. 10-2013-0074953

(51) Int. Cl.
| | |
|---|---|
| *G02B 1/14* | (2015.01) |
| *G02B 5/30* | (2006.01) |
| *B29D 11/00* | (2006.01) |
| *H01L 51/52* | (2006.01) |
| *B29K 29/00* | (2006.01) |
| *B29C 55/02* | (2006.01) |

(52) U.S. Cl.
CPC ........ *G02B 5/305* (2013.01); *B29D 11/00644* (2013.01); *G02B 1/14* (2015.01);
(Continued)

(58) Field of Classification Search
CPC .......... B29C 66/7338; B29D 11/00644; B29K 2029/04; B29L 2011/0066;
(Continued)

(56) References Cited

U.S. PATENT DOCUMENTS

| | | | |
|---|---|---|---|
| 2009/0021671 A1* | 1/2009 | Fukagawa | .................. C08J 5/18 349/96 |
| 2009/0195733 A1 | 8/2009 | Saitoh | |

FOREIGN PATENT DOCUMENTS

| | | |
|---|---|---|
| CN | 1646953 A | 7/2005 |
| CN | 1708701 A | 12/2005 |

(Continued)

OTHER PUBLICATIONS

English translation of Korean Published Patent Application KR 10-2005-0007192 (Sata), retreived from KIPRIS dated Aug. 14, 2018.*

(Continued)

*Primary Examiner* — Jennifer D. Carruth
*Assistant Examiner* — Ryan S. Dunning
(74) *Attorney, Agent, or Firm* — Lewis Roca Rothgerber Christie LLP

(57) ABSTRACT

The present invention relates to a polyene polarizer having an order parameter (S) of about 0.9-1 inclusive and a transmittance of about 43-100% inclusive, a method for manufacturing a polyene polarizer, which can stably produce a thin polyene polarizer having a high transmittance, a high degree of polarization and a high order parameter (S) value, and a polarizing plate and an optical display device each comprising the polyene polarizer.

20 Claims, 1 Drawing Sheet

(52) U.S. Cl.
CPC .......... *H01L 51/5281* (2013.01); *B29C 55/02* (2013.01); *B29K 2029/04* (2013.01); *G02B 5/3033* (2013.01)

(58) Field of Classification Search
CPC . B32B 17/10458; B32B 2307/42; G02B 1/08; G02B 5/3025; G02B 5/3033; G02B 5/3041; G02B 5/305; G02B 27/28; G02B 27/286; G02F 1/133528; H01L 51/5281
USPC .......... 252/585; 349/96; 359/487.01, 487.02; 427/163.1; 428/1.31
See application file for complete search history.

(56) References Cited

FOREIGN PATENT DOCUMENTS

| CN | 101198890 A | 6/2008 |
|----|-------------|--------|
| CN | 101300307 A | 11/2008 |
| CN | 102257413 A | 11/2011 |
| JP | 2006-99076 | 4/2006 |
| JP | 2007-17845 | 1/2007 |
| KR | 10-2005-0007192 | 1/2005 |
| KR | 10-2006-0044763 | 5/2006 |
| KR | 10-2009-0086589 | 8/2009 |
| WO | WO 2007/052838 A1 | 5/2007 |

OTHER PUBLICATIONS

Taiwan Patent Office action dated May 17, 2016 issued in corresponding Application No. TW 103121033, 5 pages.
International Search Report corresponding to PCT/KR2014/001627, dated Jun. 10, 2014, 4 pages.
Chinese Office action dated Apr. 1, 2017, corresponding to Chinese Patent Application No. 201480037030.8 (8 pages).

* cited by examiner

[Fig. 1]
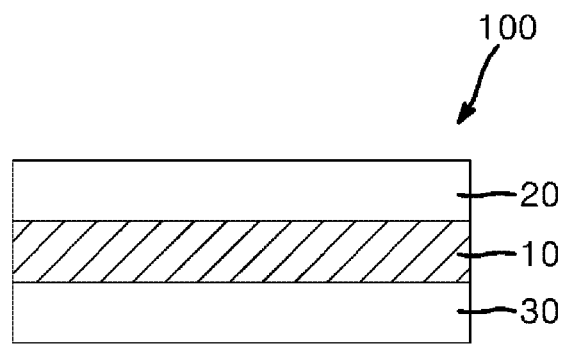
[Fig. 2]
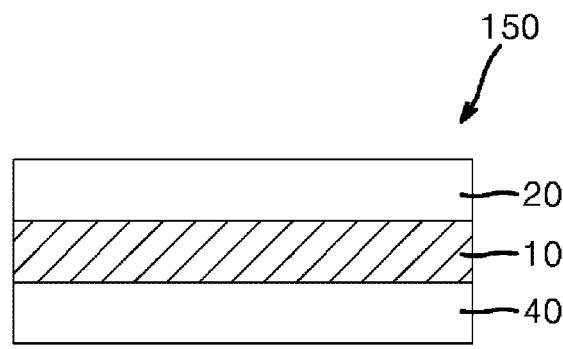
[Fig. 3]
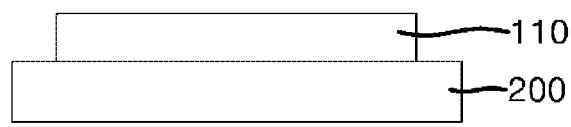

POLYENE POLARIZER HAVING SPECIFIED DICHROIC RATIO, METHOD FOR MANUFACTURING SAME, AND POLARIZING PLATE AND OPTICAL DISPLAY DEVICE COMPRISING SAME

CROSS-REFERENCED TO RELATED APPLICATION(S)

This Application is a National Phase Patent Application of, and claims priority to and the benefit of International Application Number PCT/KR2014/001627, filed on Feb. 27, 2014, which claims priority to and the benefit of Korean Application Number 10-2013-0074953, filed Jun. 27, 2013, the entire contents of all of which are incorporated herein by reference.

TECHNICAL FIELD

The present invention relates to a polyene polarizer, a method for preparing the same, a polarizing plate including the same, and an optical display including the same.

BACKGROUND

An organic light emitting display is self-luminous and does not need a polarizing plate. However, the organic light emitting display includes the polarizing plate to prevent deterioration in brightness due to reflection of external light by an Al plate of an OLED driving panel. The polarizing plate has a structure in which a protective film such as triacetyl cellulose film is laminated on a polarizer via a water-based bonding agent including an aqueous polyvinyl alcohol solution. A polyene polarizer having a polyvinylidene structure formed by dehydration of a polyvinyl alcohol film may be used.

Recently, with increasing demand for thinner polarizers, various attempts have been made to reduce thickness of the polarizer. However, there is a problem of deterioration in degree of polarization when the polarizer has a thin thickness, and the polarizer should exhibit high transmittance.

DISCLOSURE

Technical Problem

One aspect of the present invention is to provide a thin polyene polarizer exhibiting high transmittance, high degree of polarization, and high order parameter (S) value.

Another aspect of the present invention is to provide a method for preparing a polyene polarizer, by which a thin polyene polarizer exhibiting high transmittance, high degree of polarization and high order parameter (S) value can be stably prepared.

Further aspect of the present invention is to provide an optical display including the polyene polarizer.

Technical Solution

In accordance with one aspect of the present invention, a polyene polarizer may have an order parameter (S) value of about 0.9 or more as represented by Equation 1, and a transmittance from about 43% or more and 100% or less.

In accordance with another aspect of the present invention, a polyene polarizer may have an order parameter (S) value of about 0.9 or more as represented by Equation 1, and a thickness of greater than 0 and about 10 μm or less.

In accordance with a further aspect of the present invention, a method for preparing a polyene polarizer may include: performing dehydration and dry stretching of a polyvinyl alcohol film formed of a polyvinyl alcohol resin having a degree of polymerization of greater than 0 and less than about 2000, or a laminated body including the polyvinyl alcohol film, followed by wet-stretching in about 5 wt % to 10 wt % boric acid solution.

In accordance with yet another aspect of the present invention, a polarizing plate may include: the polyene polarizer; an optical film or a base film laminated on at least one surface of the polyene polarizer.

In accordance with yet another aspect of the present invention, an optical display may include the polarizing plate.

Advantageous Effects

The present invention provided a thin polyene polarizer exhibiting high transmittance, high degree of polarization, and high order parameter S value. The present invention provided a method for preparing a polyene polarizer, by which a thin polyene polarizer exhibiting high transmittance, high degree of polarization and high order parameter S value can be stably prepared. The present invention provided an optical display including the polyene polarizer.

DESCRIPTION OF DRAWINGS

FIG. 1 is a cross-sectional view of a polarizing plate according to one embodiment of the present invention.

FIG. 2 is a cross-sectional view of a polarizing plate according to another embodiment of the present invention.

FIG. 3 is a cross-sectional view of an optical display according to one embodiment of the present invention.

BEST MODE

Embodiments of the present invention will be described in detail with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification. As used herein, terms such as "upper side" and "lower side" are defined with reference to the accompanying drawings. Thus, it will be understood that the term "upper side" can be used interchangeably with the term "lower side".

In one embodiment of the invention, a polyene polarizer may have an order parameter (S) from about 0.9 or more and 1 or less, for example, from about 0.901 to 1, specifically, about 0.901, 0.905, 0.910, 0.915, 0.920, 0.925, 0.930, 0.935, 0.940, 0.945, 0.950, 0.955, 0.960, 0.965, 0.970, 0.975, 0.980, 0.985, 0.990, 0.995, or 1.0, as represented by Equation 1. If the polyene polarizer has an order parameter (S) of less than 0.9, the polyene polarizer exhibits low dichroic ratio (Rd) and low degree of orientation, and thus cannot be used as a polarizer:

$$\text{Order parameter}(S) = (Rd-1)/(Rd+2) \qquad \text{<Equation 1>}$$

(wherein Rd is calculated by Equation 2 or Equation 3 as follow)

$$Rd = \log(Tc)/\log(Tp) \qquad \text{<Equation 2>}$$

(wherein Tc is orthogonal transmittance of polyene polarizer(unit: %), and Tp is parallel transmittance thereof(unit: %))

$$Rd=\log(Ts/100\times(1-V/100))/\log(Ts/100\times(1+V/100)) \quad \text{<Equation 3>}$$

(wherein Ts is transmittance of a single polyene polarizer (unit: %), and V is a degree of polarization of the polyene polarizer(unit: %))

Here, Ts is transmittance of a single polyene polarizer, Tc is transmittance measured when two polyene polarizers overlap each other such that absorption axes or transmission axes thereof are orthogonal to each other, and Tp is transmittance measured when the two polyene polarizers overlap each other such that absorption axes or transmission axes thereof are parallel to each other. Transmittance is an average value of the total solar transmittance.

The polyene polarizer may have a transmittance from about 43% or more and 100% or less, for example, from about 43-45%. Within this range, the polyene polarizer can be applied to an optical display. The polyene polarizer may have a degree of polarization from about 96% or more and 100% or less, for example, from about 96-99.9%, or from about 96.5-100%.

Although a general polyene polarizer exhibits a degree of polarization decreasing proportionally to increasing transmittance thereof, the polyene polarizer according to the invention may exhibit a high degree of polarization and a high order parameter (S) value despite high transmittance thereof.

The polyene polarizer is a thin polarizer and may have a thickness of greater than 0 and about 10 µm or less, for example, from about 2-8 µm. Within this range, the polyene polarizer can be applied to polarizing plates and is effective at a thin thickness. Although a general polyene polarizer exhibits a lower degree of polarization at a thinner thickness thereof, the polyene polarizer according to the invention can maintain a high degree of polarization at a thin thickness thereof.

The polyene polarizer may have a dichroic ratio of about 29 or more, for example, from about 29 to 90, for example, about 32 or more, specifically, about 29, 30, 31, 32, 33, 34, 35, 36, 37, 38, 39, 40, 41, 42, 43, 44, 45, 46, 47, 48, 49, or 50. Within this range, the polyene polarizer can exhibit a high order parameter (S) and a high degree of polarization.

According to one embodiment of the invention, a method for preparing a polyene polarizer may include performing dehydration and dry stretching of a polyvinyl alcohol film formed of a polyvinyl alcohol resin having a degree of polymerization of greater than 0 and less than 2000, or a laminated body including the polyvinyl alcohol film, followed by wet-stretching in a about 5 wt % to 10 wt % boric acid solution.

If the degree of polymerization of the polyvinyl alcohol resin is greater than 2000, the film can break during wet stretching, and the finally prepared polyene polarizer can be deteriorated in transmittance. For example, the polyvinyl alcohol resin may have a degree of polymerization of about 1000-1700, for example, about 1000, 1100, 1200, 1300, 1400, 1500, 1600, or 1700. The polyvinyl alcohol resin may have a degree of saponification from about 99-100 mol %, for example, from about 99-99.9 mol %. Within this range, the polyvinyl alcohol film can exhibit excellent durability and be highly stretched.

The polyvinyl alcohol film may be prepared by coating a polyvinyl alcohol resin solution, which includes a polyvinyl alcohol resin and a typical solvent such as water, organic solvent and the like, onto a base film or the like, followed by drying the resin solution and removing the base film. The polyvinyl alcohol film may have a thickness from about 5 µm to 60 µm. The polyvinyl alcohol resin solution may further include acid as a dehydrating agent.

The laminated body including the polyvinyl alcohol film may include a base film, and the polyvinyl alcohol film formed on one or both surfaces of the base film. Since the laminated body is formed by integrating the base film with the polyvinyl alcohol film, the polyvinyl alcohol film can be prevented from breaking during dry and wet stretching, and a thin polyvinyl alcohol film or a thin polyene polarizer can be prepared.

The base film may include polyolefin films including polypropylene and the like, polyester including polyethylene terephthalate, polyethylene naphthalate or the like, cellulose films including triacetyl cellulose (TAC) or the like, acrylic, cycloolefin polymer (COP) films, polycarbonate films, polyethersulfone films, polysulfone films, polyimide films, polyimide films, polyarylate films, polyvinyl alcohol films, polyvinyl chloride films, and polyvinylidene chloride films, without being limited thereto. The base film may have a thickness from about 5 µm to 500 µm. In addition, the base film may be removed after wet stretching, or otherwise, the laminated body of the base film and the polyene polarizer may be used as a polarizing plate without removing the base film after wet stretching.

The laminated body may be prepared by coating the polyvinyl alcohol resin solution onto one or both surfaces of the base film, followed by drying. Specifically, the polyvinyl alcohol resin solution, which includes a polyvinyl alcohol resin having a degree of polymerization of greater than 0 and less than 2000 and a typical solvent, is prepared and coated onto one or both surfaces of the base film, followed by drying, thereby preparing the laminated body. In addition, the polyvinyl alcohol resin solution may further include acid as a dehydrating agent.

The acid allows a polyvinylene structure to be formed by dehydrating polyvinyl alcohol, and may include an inorganic acid, an organic acid, and mixtures thereof. The inorganic acid may include hydrochloric acid, sulfuric acid, nitric acid, phosphoric acid and the like, and the organic acid may include a sulfonic acid of an aromatic hydrocarbon. The sulfonic acid of an aromatic hydrocarbon has low volatility to maintain constant acid concentration during dehydration, can be combined with the polyvinyl alcohol resin, and can be easily removed after polyene conversion. For example, the organic acid may be a sulfonic acid of a carbon number 6-20 aromatic hydrocarbon, such as toluenesulfonic acid, for example, p-toluenesulfonic acid or a mixture including p-toluenesulfonic acid.

In particular, when the organic acid is used as the dehydration agent, the polyvinyl alcohol film is prepared by adding the organic acid to the polyvinyl alcohol resin solution, and in this case, additional acid treatment is not needed. In addition, since polyene conversion can be sufficiently achieved using even a small amount of the organic acid, the acid need not to be removed from the polarizer after polyene conversion, and can be easily removed even though the acid is present in the polarizer. In some embodiments, the acid may be present in an amount of about greater than 0 wt % and 5 wt % or less, for example, from about 3 wt % to 5 wt % in the polyvinyl alcohol film. Within this range, polyene conversion of polyvinyl alcohol can be sufficiently performed, and the acid can be easily removed from the finally prepared polarizer and thus be prevented from remaining in the polarizer.

The acid may be present in an amount of greater than 0 parts by weight and about 5 parts by weight or less, for example, about 0.5 parts by weight to 5 parts by weight, or about 3 parts by weight to 5 parts by weight, based on 100 parts by weight of the polyvinyl alcohol resin. Within this range, polyene conversion of polyvinyl alcohol can be sufficiently performed, and the acid can be easily removed and thus prevented from remaining in the polarizer.

The laminated body may have a thickness from about 5 µm-500 µm, for example, from about 5 µm-100 µm. Within this range, the polyvinyl alcohol film can be prevented from breaking during stretching, and a thin polarizer can be prepared.

Dehydration allows polyvinyl alcohol of the polyvinyl alcohol film to be converted into polyvinylidene, and since dehydration is performed simultaneously with dry stretching, stretching as well as polyene conversion by dehydration can be simultaneously performed. Dehydration and dry stretching include treating the polyvinyl alcohol film or the laminated body including the polyvinyl alcohol film at about 100° C. or more and about 200° C. or less, for example, about 100° C.-about 160° C., for about 1 minute to 10 minutes. Within this range, dehydration can be sufficiently performed. Upon dry stretching, the polyvinyl alcohol film or laminated body is stretched in a stretching ratio from about 2-8 times, for example, from about 2-6 times, or from about 4-8 times, specifically, about 2, 3, 4, 5, 6, 7, or 8 times an initial length thereof. Within this range, the polyvinyl alcohol resin can exhibit improved orientation.

Before dehydration and dry stretching, the method may further include swelling the polyvinyl alcohol film or laminated body by immersing in the dehydrating agent. Such swelling can allow the dehydrating agent to permeate into the polyvinyl alcohol film.

The polyvinyl alcohol film or laminated body subjected to dehydration and dry stretching may undergo wet stretching in an about 5 wt %-10 wt % boric acid solution. Wet stretching can secure a double bond of a polyene and provide an effect of crosslinking, and can improve the degree of orientation of the polyene polarizer and stably realize a high degree of orientation by improving dichroic ratio thereof. If the boric acid solution has a concentration of boric acid of less than 5 wt %, the polyene polarizer does not have high dichroic ratio and thus cannot have an order parameter (S) of 0.9 or more. If the boric acid solution has a concentration of boric acid of greater than 10 wt %, there can be problem in that polyvinyl alcohol film is not easily stretched or breaks due to high crosslinking thereof.

Upon wet stretching, the polyvinyl alcohol film subjected to dry stretching may be stretched in a stretching ratio from about 1 to 3 times, for example, from about 1 to 1.5 times, for example, about 1, 1.1, 1.2, 1.3, 1.4, or 1.5 times an initial length thereof. Within this range, the polyvinyl alcohol film can have an effect of stretching. The polyvinyl alcohol film subjected to dry and wet stretching may have a total stretching ratio of 5 times to 8 times an initial length thereof. Within this range, there can be an effect on optical properties of a thin high-performance polarizing film. Wet stretching may include treating the polyvinyl alcohol film at about 50° C. or more and 100° C. or less, for example, at about 60° C. or more and 85° C. or less. Within this range, effects of stretching and fixation of a double bond can be obtained.

According to the invention, the method for preparing a polyene polarizer may further include removing the base film from the wet-stretched laminated body of the base film and the polyene polarizer. The base film may be removed by a process of bonding a release film to an opposite side of the base film, followed by removing both the base film and the release film, and the like.

According to the invention, the method may further include removing the dehydrating agent from the polyene polarizer after wet stretching. If the dehydrating agent remains in the polyene polarizer, the dehydrating agent can change polarization performance of the polarizer at high temperature. In some embodiments, the method may include immersing the polyene polarizer in an aqueous inorganic solution, such as water, weakly alkaline aqueous solutions, saline solutions, and the like.

According to the invention, the method may further include drying the polyene polarizer after wet stretching. In some embodiments, the method may include treating the polyene polarizer at about 80° C. or more and 150° C. or less, for example, about 80° C. to 120° C., for about 1 minute to 10 minutes.

In addition, an integrated body of the base film and the polyene polarizer may also be used as a polarizing plate without removing the base film from the laminated body of the base film and the polyene polarizer.

According to the invention, a polarizing plate may include a polyene polarizer, and an optical film or a base film formed on at least one surface of the polyene polarizer, wherein the polyene polarizer may include the polyene polarizer according to the embodiments of the invention. The optical film may include at least one of typical protective films and retardation films, and the base film is the base film used in the preparation of the polyene polarizer.

FIG. 1 is a cross-sectional view of a polarizing plate according to one embodiment of the present invention. Referring to FIG. 1, a polarizing plate 100 according to one embodiment may include: a polyene polarizer 10; a first optical film 20 formed on an upper surface of the polyene polarizer 10; and a second optical film 30 formed on a lower surface of the polyene polarizer 10, wherein the polyene polarizer 10 may include the polyene polarizer according to the one embodiment of the invention.

The optical film 30 is a protective film or a retardation film. For example, the optical film 30 may include at least one of cellulose films including triacetyl cellulose (TAC) or the like, polyester films including polyethylene terephthalate (PET) or the like, acrylic films, cycloolefin polymer (COP) films, polycarbonate films, polyethersulfone films, polyamide films, polyimide films, polyolefin films, polyarylate films, polyvinyl alcohol films, polyvinyl chloride films, and polyvinylidene chloride films.

The optical film may have a thickness from about 20 µm to 200 µm. Within this range, the optical film can be applied to polarizing plates. The optical film may be laminated on the polarizer by a typical method. In some embodiments, the optical film may be laminated via a bonding agent for polarizing plates, for example, a polyvinyl alcohol water-based bonding agent, or a pressure-sensitive bonding agent. A bonding layer may have a thickness from about 50 nm to 300 nm.

FIG. 2 is a cross-sectional view of a polarizing plate according to another embodiment of the present invention. Referring to FIG. 2, a polarizing plate 150 according to another embodiment of the invention may include: a polyene polarizer 10; a first optical film 20 formed on an upper surface of the polyene polarizer 10; and a base film 40 formed on a lower surface of the polyene polarizer 10, wherein the polyene polarizer 10 may include the polyene polarizer according to the one embodiment of the invention.

As described above, the base film 40 is the base film used in preparation of the polyene polarizer. The base film 40 may include polyolefin films including polypropylene or the like, polyester films including polyethylene terephthalate, polyethylene naphthalate or the like, cellulose films including triacetyl cellulose (TAC) or the like, acrylic, cycloolefin polymer (COP), polycarbonate films, polyethersulfone films, polysulfone films, polyamide films, polyimide films, polyarylate films, polyvinyl alcohol films, polyvinyl chloride films, polyvinylidene chloride films, or the like. The thickness of the base film may be controlled by stretching in preparation of the polyene polarizer, and may have a thickness from 20 μm to 200 μm. Within this range, the base film can be applied to polarizing plates.

According to the invention, an optical display may include the polarizing plate according to embodiments of the invention. The optical display may include an organic light emitting diode (OLED) display, without being limited thereto.

FIG. 3 is a sectional view of an optical display according to one embodiment. Referring to FIG. 3, the optical display may include: an OLED panel 200; and a polarizing plate 110 formed on an upper surface of the OLED panel 200, wherein the polarizing plate 110 may be any of polarizing plates according to embodiments of the invention.

Mode for Invention

Hereinafter, the present invention will be described in more detail with reference to some examples. However, it should be noted that these examples are provided for illustration only and are not to be construed in any way as limiting the present invention.

Example 1

A PVA resin solution including 100 parts by weight of a PVA resin (degree of polymerization: 1700, degree of saponification: 99.9 mol %) and 5 parts by weight of an organic acid (pTSA, p-toluenesulfonic acid) was coated onto one surface of a PP(polypropylene) base film, thereby preparing a 15 μm thick base-integrated PVA film. The prepared base-integrated PVA film was subjected to dry stretching in a stretching ratio of 4 times an initial length thereof in a forced convection OVEN at 140° C. Next, the dry-stretched PVA film was immersed in a 7 wt % boric acid solution while being subjected to wet stretching in a stretching ratio of 1.5 at 83° C., thereby obtaining a PVA film having a total stretching ratio of 6 times an initial length thereof. Next, the PVA film was dried in an OVEN at 80° C., followed by removing the base film, thereby obtaining a 5 μm thick (measured by a micrometer (Mitutoyo Co., Ltd.)) polyene polarizer.

Examples 2 to 3 and Comparative Examples 1 to 3

Each of polyene polarizers was prepared in the same manner as in Example 1 except that the amount of boric acid in the boric acid solution was changed as in Table 1.

Comparative Example 4

A polyene polarizer was prepared in the same manner as in Example 1 except that PVA having a degree of polymerization of 3500 was used instead of the PVA having a degree of polymerization of 1700.

Each of the polyene polarizers prepared in Examples and Comparative Examples was evaluated as to transmittance, degree of polarization, dichroic ratio (Rd), and order parameter (S).

(1) Transmittance, Degree of polarization: Transmittance and degree of polarization were measured on the polyene polarizer using a V-7100 (JASCO Co., Ltd.). Transmittance was measured at a wavelength from 380 nm to 780 nm.

(2) Dichroic ratio, Order parameter (S): Dichroic ratio and order parameter (S) of the polyene polarizer were calculated according to Equations 1 to 3 based on results measured by a V-7100 (JASCO Co., Ltd.).

TABLE 1

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Degree of polymerization of polyvinyl alcohol | 1700 | 1700 | 1700 | 1700 | 1700 | 1700 | 3500 |
| Amount of boric acid in boric acid solution (wt %) | 7 | 10 | 5 | 3 | 1 | 13 | 7 |
| Thickness of polarizer (μm) | 5 | 5 | 5 | 5 | 5 | 5 | Broken |
| Transmittance (%) | 43.7 | 43.2 | 43.8 | 43.3 | 42.1 | 43.5 | — |
| Dichroic ratio | 44.7 | 36.0 | 29.0 | 26.1 | 27.1 | 26.1 | — |
| Order Parameter (S) | 0.936 | 0.921 | 0.903 | 0.893 | 0.897 | 0.893 | — |
| Degree of polarization (%) | 99.5 | 99.0 | 96.9 | 96.6 | 98.3 | 96.3 | — |

As shown in Table 1, it can be seen that the polarizer according to the invention exhibited high transmittance, high degree of polarization and high order parameter (S) despite thin thickness thereof.

Conversely, the polarizers of Comparative Examples 1 to 3 prepared through wet stretching in the boric acid solution having a concentration of boric acid out of the range according to the invention could not maintain high transmittance, high degree of polarization and high order parameter (S). In addition, it can be seen that the polarizer of Comparative Example 4 prepared from the PVA having a degree of polymerization of 2000 or more suffered from film breakage during stretching.

It should be understood that various modifications, changes, alterations, and equivalent embodiments can be made by those skilled in the art without departing from the spirit and scope of the invention.

The invention claimed is:

1. A polyene polarizer, the polyene polarizer itself having an order parameter (S) from about 0.9 or more and 1 or less as represented by Equation 1, a transmittance from about 43% or more and 100% or less, and a dichroic ratio of 29 or greater to less than 50:

$$\text{Order parameter}(S)=(Rd-1)/(Rd+2) \qquad <\text{Equation 1}>$$

wherein Rd is calculated by Equation 2 or 3;

$$Rd=\log(Tc)/\log(Tp) \qquad <\text{Equation 2}>$$

wherein Tc is an orthogonal transmittance of the polyene polarizer (unit: %), and Tp is a parallel transmittance thereof (unit: %); and $$Rd=\log(Ts/100\times(1-V/100))/\log(Ts/100\times(1+V/100)) \qquad <\text{Equation 3}>$$

wherein Ts is a transmittance of a single polyene polarizer (unit: %), and V is a degree of polarization of the single polyene polarizer (unit: %).

2. A polyene polarizer, the polyene polarizer itself having an order parameter (S) from about 0.9 or more and 1 or less as represented by Equation 1, a thickness of about greater than 0 and 10 μm or less, and a dichroic ratio of 29 or greater to less than 50:

$$\text{Order parameter}(S)=(Rd-1)/(Rd+2) \qquad <\text{Equation 1}>$$

wherein Rd is calculated by Equation 2 or 3;

$$Rd=\log(Tc)/\log(Tp) \qquad <\text{Equation 2}>$$

wherein Tc is an orthogonal transmittance of the polyene polarizer (unit: %), and Tp is a parallel transmittance thereof (unit: %); and $$Rd=\log(Ts/100\times(1-V/100))/\log(Ts/100\times(1+V/100)) \qquad <\text{Equation 3}>$$

wherein Ts is a transmittance of a single polyene polarizer (unit: %), and V is a degree of polarization of the single polyene polarizer (unit: %).

3. The polyene polarizer according to claim 1, wherein the polarizer itself has a degree of polarization of about 96% or more to 99.99% or less.

4. A method for preparing the polyene polarizer according to claim 1, the method comprising:
performing dehydration and dry stretching of a polyvinyl alcohol film formed of a polyvinyl alcohol resin having a degree of polymerization of about greater than 0 and less than 2000, or a laminated body including the polyvinyl alcohol film, followed by wet stretching in an about 5 wt % to 10 wt % boric acid solution.

5. The method according to claim 4, wherein the dehydration and the dry stretching are simultaneously performed.

6. The method according to claim 4, wherein the dehydration comprises treating the polyvinyl alcohol film or the laminated body at about 100° C. to 160° C. for about 1 minute to 10 minutes.

7. The method according to claim 4, wherein the dry stretching comprises stretching the polyvinyl alcohol film in a stretching ratio from about 2 to 6 times an initial length thereof.

8. The method according to claim 4, wherein the wet stretching is performed in a stretching ratio from about 1 to 1.5 times an initial length of the polyvinyl alcohol with respect to the polyvinyl alcohol film after dry stretching.

9. The method according to claim 4, wherein the polyvinyl alcohol film further comprises acid.

10. The method according to claim 9, wherein the acid is an organic acid.

11. The method according to claim 10, wherein the organic acid comprises a sulfonic acid of a carbon number 6-20 aromatic hydrocarbon.

12. The method according to claim 9, wherein the acid is present in an amount of about 0.5 parts by weight to 5 parts by weight based on 100 parts by weight of the polyvinyl alcohol resin.

13. The method according to claim 4, further comprising: immersing the polyvinyl alcohol film or the laminated body comprising the polyvinyl alcohol film in a dehydrating agent.

14. The method according to claim 4, wherein the laminated body comprises a base film, and the polyvinyl alcohol film formed on one or both surfaces of the base film.

15. The method according to claim 14, further comprising: removing the base film from the laminated body after wet stretching.

16. A polarizing plate comprising:
the polyene polarizer according to claim 1; and
an optical film or a base film, formed on one surface or both surfaces of the polyene polarizer.

17. The polarizing plate according to claim 16, wherein the base film is formed of at least one of polyolefin, polyester, cellulose, acrylic, cycloolefin polymer(COP), polycarbonate, polyethersulfone, polysulfone, polyimide, polyimide, polyarylate, polyvinyl alcohol, polyvinyl chloride, and polyvinylidene chloride films.

18. A polarizing plate comprising:
the polyene polarizer according to claim 1; and
an adhesive layer formed on one or both surfaces of the polyene polarizer.

19. An optical display comprising the polarizing plate according to claim 16.

20. An optical display comprising the polarizing plate according to claim 18.

* * * * *